United States Patent

Otsuka

[11] 4,255,110
[45] Mar. 10, 1981

[54] APPARATUS FOR PRODUCING CORRUGATED FOAMED PLASTIC SHEET

[75] Inventor: Isao Ōtsuka, Utsunomiya, Japan

[73] Assignee: Japan Styrene Paper Corporation, Tokyo, Japan

[21] Appl. No.: 52,918

[22] Filed: Jun. 26, 1979

Related U.S. Application Data

[63] Continuation of Ser. No. 872,239, Jan. 25, 1978, abandoned.

[30] Foreign Application Priority Data

Feb. 15, 1977 [JP] Japan .................. 52/15297

[51] Int. Cl.³ .................. B29F 3/04; B29D 27/00
[52] U.S. Cl. .................. 425/381; 264/51; 264/177 R; 264/209.4; 425/466; 425/817 C
[58] Field of Search .................. 425/376 R, 465, 466, 425/467, 381, 817 C; 264/177 R, 46.1, 51, 209

[56] References Cited

U.S. PATENT DOCUMENTS

| Re. 28,600 | 11/1975 | Lemelson | 425/465 X |
|---|---|---|---|
| 281,711 | 7/1883 | Merrill | 425/467 |
| 1,768,671 | 7/1930 | Devine | 425/467 |
| 2,230,309 | 2/1941 | Reed | 264/177 R X |
| 2,687,997 | 8/1954 | Marchand | 264/177 R X |
| 2,750,631 | 6/1956 | Johnson | 264/177 R X |
| 3,060,504 | 10/1962 | Thomas et al. | 425/466 X |
| 3,355,769 | 12/1967 | Fogelberg | 425/466 X |
| 3,410,933 | 11/1968 | Moseley | 264/51 |
| 3,936,518 | 2/1976 | Soda et al. | 264/46.1 X |
| 3,978,182 | 8/1976 | Luthra | 264/51 |

FOREIGN PATENT DOCUMENTS

| 2322722 | 5/1977 | France | 425/467 |
|---|---|---|---|
| 358364 | 4/1938 | Italy | 264/177 R |
| 4920380 | 7/1967 | Japan | 425/467 |
| 43-7466 | 3/1968 | Japan | 264/177 R |
| 43-24560 | 10/1968 | Japan | 264/177 R |
| 5138340 | 4/1973 | Japan | 264/177 R |

Primary Examiner—Philip Anderson
Attorney, Agent, or Firm—Wenderoth, Lind & Ponack

[57] ABSTRACT

An apparatus for producing a corrugated foamed plastic sheet includes an extruder and a die provided at the extrusion end of the extruder. The die has a plurality of grooves provided on one of its surfaces which make contact with the foamed sheet being produced. The grooves extending from the resin feed inlet toward the resin exit of the die.

4 Claims, 13 Drawing Figures

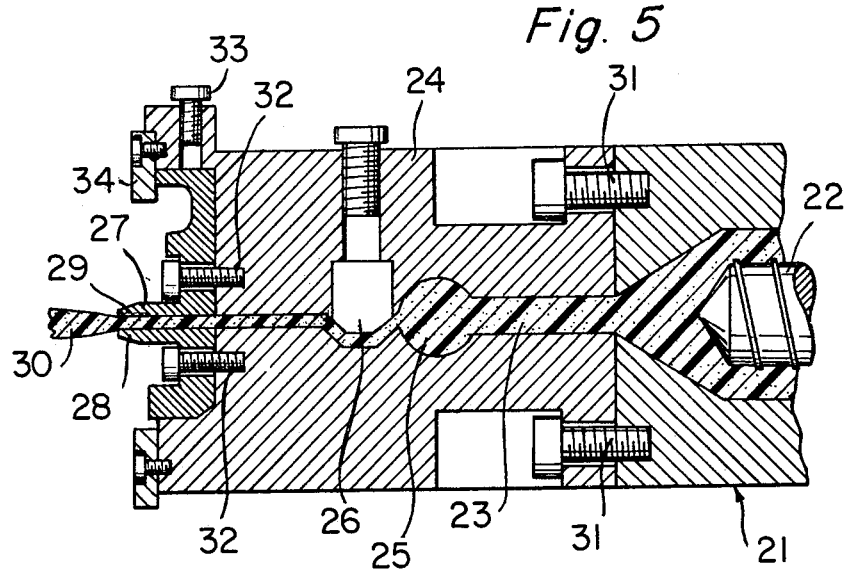
Fig. 5
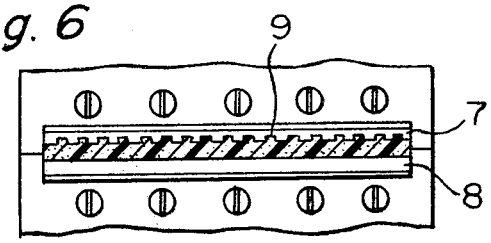
Fig. 6
 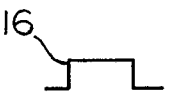  
Fig. 7a  Fig. 7b  Fig. 7c  Fig. 7d

APPARATUS FOR PRODUCING CORRUGATED FOAMED PLASTIC SHEET

This is a continuation of application Ser. No. 872,239, filed Jan. 25, 1978, now abandoned.

BACKGROUND OF THE INVENTION

This invention relates to an apparatus, especially an extruding apparatus, for producing corrugated foamed plastic sheets.

Conventional methods for producing thermoplastic synthetic resin foams having depressed and raised portions such as a corrugated shape essentially involve first preparing a foamed sheet having a flat surface, and then shaping it by means of a heated mold or roll. These methods, however, have the defect that they entail an after-shaping step and require additional devices for this step, and the cellular structure of the surface of the resulting corrugated foamed plastic sheet is destroyed thereby deteriorating the properties of the foamed plastic sheet.

It is an object of this invention therefore to provide an apparatus for easily producing corrugated foamed plastic sheets having superior properties from lesser amounts of raw material without impairing the superior properties of the foams and without the need to shape or otherwise process the resulting foamed plastic sheet for corrugation.

Extensive investigations in an attempt to eliminate the defects of the conventional techniques and to achieve the object of this invention led to the development of the present invention.

SUMMARY OF THE INVENTION

The present invention provides an apparatus for producing a corrugated foamed plastic sheet which comprises an extruder and a die provided at the extrusion end of the extruder, wherein the die has a plurality of grooves provided on one or both of its surfaces which make contact with the foamed plastic sheet being produced. These grooves extend from the resin feed inlet toward the resin exit of the die.

The term "corrugated", as used in this application, means that the cross-section of the foamed plastic sheet in a direction at right angles to the extruding direction has corrugated or like shapes.

The plastics used in this invention are thermoplastic resins such as polyethylene, polypropylene, polystyrene, polyvinyl chloride, an ethylene/vinyl acetate copolymer, and blends of these resins. The foamed plastic sheets in accordance with this invention can be prepared by foaming such resins with low-boiling solvents such as butane, propane or Freon gases, and heat-decomposable blowing agents such as azodicarbonamide or p,p'-hydroxybisbenzenesulfonyl hydrazide. If desired, crosslinking agents, fillers, coloring agents and other conventional additives may be incorporated in the resins.

Preferred forms of the die having grooves in accordance with this invention are circular dies and flat dies.

BRIEF DESCRIPTION OF THE DRAWINGS

Preferred embodiments of the apparatus of this invention are described by reference to the accompanying drawings in which:

FIG. 5 is a partial cross-sectional view showing another embodiment of the apparatus of this invention which includes a manifold die as an example of the flat die;

FIG. 6 is a partial front elevation of the lip portion in FIG. 5; and

FIGS. 7a–7d show shows specific examples of the shape of a groove in the lip.

DETAILED DESCRIPTION OF THE INVENTION

Figure 1:
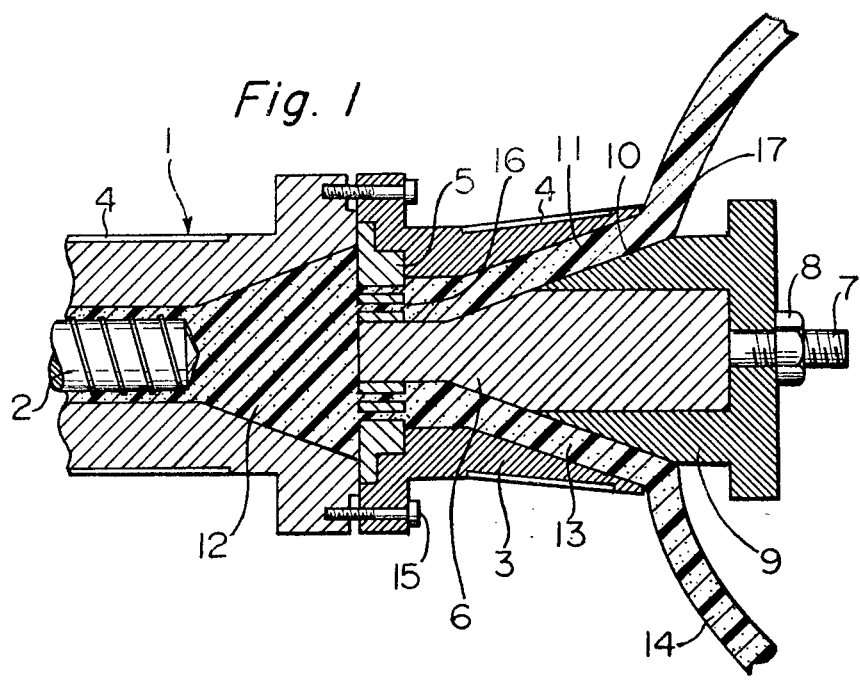
FIG. 1 is a sectional view of one example of the apparatus of this invention which includes a circular die.

Referring to FIG. 1, the reference numeral 1 represents an extruder; 2, a screw; 3, an exterior die; 4, an electrode plate; 5, a breaker plate; 6, a mandrel; 7, a screw portion of a shaft; 8, an adjusting nut; 9, an interior die; 10 and 11, grooves in the dies; 12, a foamable thermoplastic resin; 13, the thermoplastic resin being foamed; 14, a corrugated foamed plastic sheet; 15, a bolt; 16, a resin flow inlet of the die; and 17, a resin extruding port of the die.

Figure 2:
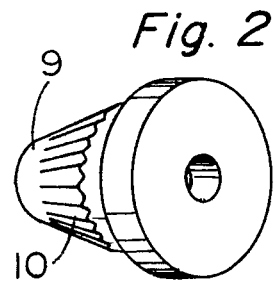
FIG. 2 is a perspective view showing one example of an interior die.
Figure 4A:
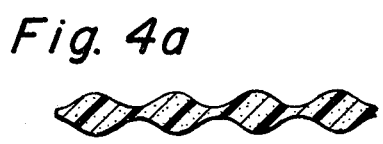
FIGS. 4a–4d show sectional views of some examples of corrugated foamed plastic sheets in accordance with this invention.
Figure 4B:
Figure 4C:
Figure 4D:

In FIG. 2, the reference numeral 9 represents the interior die having grooves 10.

Figure 3:
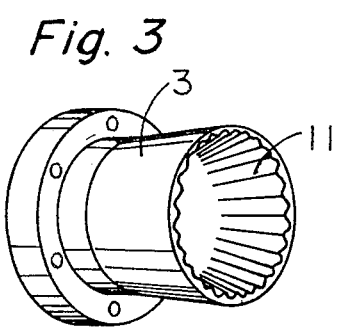
FIG. 3 is a perspective view of one example of an exterior die.

In FIG. 3, the reference numeral 3 represents the exterior die having grooves 11.

The interior and exterior dies of the types shown in FIGS. 2 and 3 form a resin passageway having the shape of a frustum or a similar solid, and the base of the frustum corresponds to the resin-extruding opening, and its top or smaller side corresponds, to the resin-feed inlet.

Preferably, the grooves in each die are formed in such a manner that their depth and/or width increase progressively from the resin feed inlet side toward the resin extruding opening.

Some specific cross-sectional shapes of the corrugated foamed plastic sheet produced by the apparatus of this invention are shown in FIGS. 4a–4d. The cross-sectional shapes of the corrugated foamed plastic sheets can be chosen as desired by selecting the shape of the die lip of the interior or exterior die.

In the apparatus of this invention, the depth, width and length of the grooves of the exterior or interior die can be selected as desired. Generally, the depth of each groove is 0.1 mm to 10 mm, preferably 0.2 mm to 3 mm at that portion of the groove for passage of the resin which has the greatest sectional area. The width of each groove is generally 0.1 mm to 10 mm, preferably 1 mm to 3 mm. The length of each groove is generally 1 mm to 50 mm, preferably 10 mm to 30 mm.

The shape of the cross-sectional surface of each groove at the die lip portion may be any of the desired shape, such as a semicircle, a square, a rectangle, a U-shape, or a rectangle with rounded corners.

When it is desired to obtain a foamed sheet which is corrugated only at one surface, only one of the exterior or interior dies is grooved, and a grooveless annular die is used in place of the other grooved die shown in the drawings.

In operation, a foamable thermoplastic resin is fed into the extruder, and is kneaded by the screw 2. The kneaded charge is heated and passed through the breaker plate 5. The thermoplastic resin thus maintained at a temperature suitable for foaming is extruded from an annular die consisting of the grooved interior and exterior dies 9 and 3, thereby affording a corrugated foamed plastic sheet. In this type of apparatus, the thickness of the foamed sheet can be controlled as desired during the production by turning the adjusting nut 8 which moves the interior die and thus adjusts the distance between the interior die 9 and the exterior die 3.

Now referring to FIGS. 5 and 6, the reference numeral 21 represents an extruder; 22, a screw; 23, a foamable thermoplastic resin; 24, a manifold die; 25, a manifold; 26, a choke bar for pressure control; 27, an upper lip; 28, a lower lip; 29, the grooves on the lips; 30, a foamed plastic sheet; 31, a die-fitting bolt; 32, a lip-fitting bolt; 33, a bolt for adjusting the lip clearance; and 34, an electrical heater plate. In FIGS. 7a–7d, the reference numeral 15, represents a semicircular shape; 16, a rectangular shape; 17, a combination of 15 and 16; and 18, a modification of 16.

The flow of a foamable resin is described with reference to FIG. 5.

The extruder 21 is charged with a thermoplastic resin, a blowing agent and other optional additives. These materials are kneaded under pressure in the direction of extrusion by means of screw 22 to form foamable thermoplastic resin 23. The resin is maintained at a temperature suitable for foaming by means of manifold 25, and is simultaneously spread uniformly in the lateral direction of die 24. The resin passes choke bar 26 for pressure control, and is extruded while in contact with lips 27 and 28 disposed at the tip of the die. It is molded by grooves 29 of the lips to form a corrugated foamed plastic sheet 30.

The foamable thermoplastic resin 23 must be kept in the unfoamed state until it is extruded from the lips 27 and 28.

The corrugated shape of the foamed sheet is an enlarged counterpart of the configuration of the grooved portion of the lips irrespective of the expansion ratio of the product (2 to 100 times).

In the die of the above type, each groove in the lip has a depth of 0.1 to 10 mm, preferably 0.2 to 5 mm, a width of 0.1 to 100 mm, preferably 0.2 to 50 mm, and a length of 1 to 100 mm, preferably 5 to 50 mm. The open width of the lip is made to correspond with the open width of the extruding opening of the flat die. Preferably, it is 20 to 1500 mm, especially 25 to 1100 mm. The shape and number of grooves on the lips are selected according to the purpose of use of the final product. When it is desired to obtain a foamed sheet having a corrugated form on both surfaces, both the upper and the lower lips should be grooved. The thickness of the foamed sheet can be controlled by adjusting the clearance of the lips by means of bolt 33.

Corrugated foamed plastic sheets can also be produced by providing corrugated grooves on the upper and lower portions of the resin extrusion opening of the flat die without using lips. The use of lips, however, is preferred in order to easily select the thickness and corrugated shape of the foamed plastic sheets.

In addition to manifold dies, fish tail dies and screw dies are also among those flat dies which can be conveniently used in this invention.

Thus, the apparatus of this invention permits mass-production of a foamed plastic sheet with a corrugated surface particularly having superior uniform properties, such as cushioning ability from small amounts of resin by a simple operation.

The corrugated foamed plastic sheets obtained by the apparatus of this invention can be used in a wide range of applications, for example, as heat insulating materials and cushioning materials, because of their excellent characteristics.

What is claimed is:

1. An apparatus for producing a corrugated foamed plastic sheet, said apparatus comprising:
   extruder means for extruding plastic resin through one end thereof;
   circular die means connected to the extrusion end of said extruder means for forming a corrugated foamed sheet from the plastic resin extruded from said extruder means, said die means being comprised of:
   a hollow exterior die fitted onto the extrusion end of said extruder means;
   a central mandrel within and spaced from said hollow exterior die;
   an adjustable interior die affixed to the outside of said central mandrel, at least a portion of the exterior surface of said interior die being inside and spaced from the interior surface of said hollow exterior die, an extruded resin passageway being formed by the space between said central mandrel and said interior die and said exterior die;
   said interior die having a plurality of grooves on the exterior surface thereof spaced from the interior surface of said exterior die, said grooves extending to the outlet end of said passageway and said exterior surface of said interior die, the depth and/or width of said grooves increasing progressively from the resin inlet end thereof to the resin outlet end thereof; and
   said exterior die having a smooth interior surface; and
   bolt means adapted to connect said interior die to said central mandrel and to permit said interior die to move relative to the interior surface of said exterior die, whereby the width of said passageway between said interior and exterior dies is variable.

2. An apparatus as claimed in claim 1, wherein interior surface of said exterior die is frustum-shaped, and said exterior surface of said interior die is frustum-shaped.

3. An apparatus as claimed in claim 1, wherein said mandrel and said interior die extend outwardly from said extrusion end of said extruder means and do not extend into said extruder means from said extrusion end thereof.

4. An apparatus as claimed in claim 1, further comprising breaker plate means separating the interior of said extruder means from said resin passageway for allowing said resin to be extruded from said interior of said extruder means to said resin passageway.

* * * * *